United States Patent
Yamamoto et al.

[11] Patent Number: 5,858,893
[45] Date of Patent: Jan. 12, 1999

[54] CERAMIC COMPOSITION WITH LOW DIELECTRIC CONSTANT AND METHOD OF MAKING SAME

[75] Inventors: Joyce K. Yamamoto; Rong-Fong Huang, both of Albuquerque, N. Mex.

[73] Assignee: Motorola Inc., Schaumburg, Ill.

[21] Appl. No.: 909,999

[22] Filed: Aug. 12, 1997

[51] Int. Cl.[6] ............................................ C03C 14/00
[52] U.S. Cl. .................................... 501/32; 264/344
[58] Field of Search ............................. 501/32; 264/344

[56] References Cited

U.S. PATENT DOCUMENTS

| | | | |
|---|---|---|---|
| 3,582,385 | 6/1971 | Duke et al. | 501/32 |
| 3,787,219 | 1/1974 | Amin . | |
| 4,360,567 | 11/1982 | Guillevic | 428/410 |
| 4,615,987 | 10/1986 | Chyung et al. | 501/8 |
| 4,897,509 | 1/1990 | Holleran et al. | 501/69 |
| 4,973,564 | 11/1990 | Chyung et al. | 501/32 |
| 5,024,975 | 6/1991 | Hartmann | 501/65 |
| 5,070,046 | 12/1991 | Hu | 501/9 |
| 5,132,256 | 7/1992 | Beall et al. | 501/95 |
| 5,137,848 | 8/1992 | Barker et al. | 501/18 |
| 5,185,215 | 2/1993 | Adams, Jr. et al. | 501/32 |
| 5,206,190 | 4/1993 | Jean et al. | 501/32 |
| 5,212,121 | 5/1993 | Omata et al. | 501/32 |
| 5,281,559 | 1/1994 | Bansal | 501/8 |
| 5,468,694 | 11/1995 | Taguchi et al. | 501/77 |
| 5,485,132 | 1/1996 | Abe et al. | 501/32 |
| 5,518,969 | 5/1996 | Ragan | 501/32 |
| 5,532,194 | 7/1996 | Kawashima et al. | 501/9 |
| 5,562,972 | 10/1996 | Sasaki | 501/19 |
| 5,578,534 | 11/1996 | Talmy et al. | 501/32 |

FOREIGN PATENT DOCUMENTS

| | | | |
|---|---|---|---|
| 362252340A | 11/1987 | Japan | C03C 10/08 |

*Primary Examiner*—David Brunsman
*Attorney, Agent, or Firm*—Colin M. Raufer; Gary J. Cunningham

[57] ABSTRACT

Multiphase ceramic materials for use in electronic applications such as patch antennas and multilayered ceramic devices may be fabricated by providing a novel combination of a glassy precursor material with operable amounts of a high purity cordierite material. The combined materials are sintered at appropriate temperatures, so that a non-glassy celsian type phase is formed. The materials of the instant invention, fabricated according to the method disclosed herein, demonstrate low dielectric constant (K) and low electrical loss (high Q) characteristics.

22 Claims, 4 Drawing Sheets

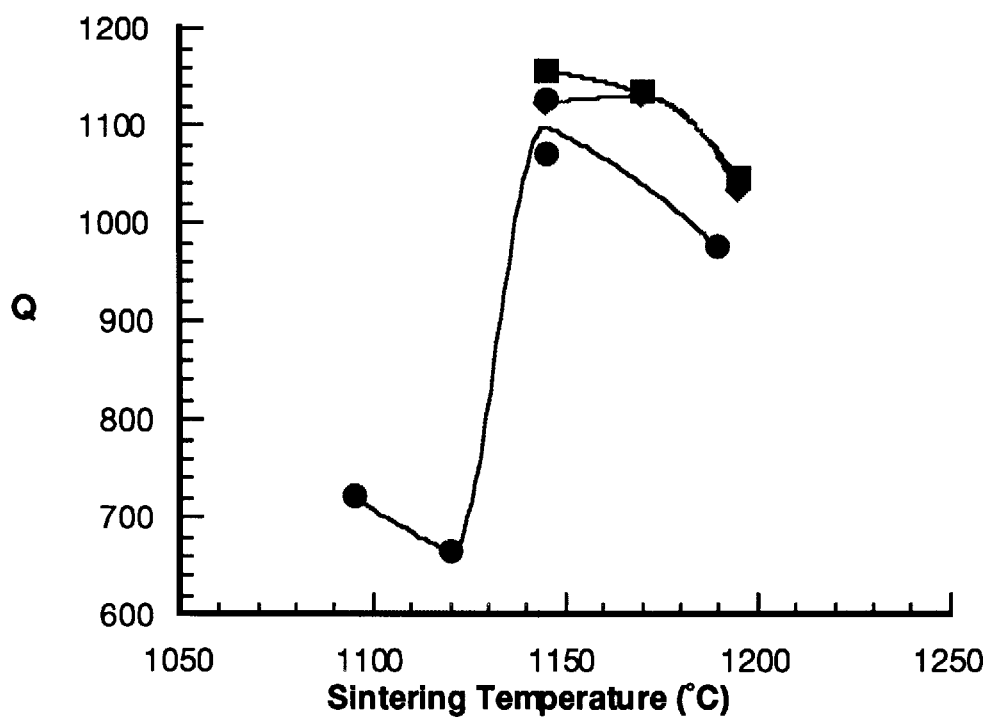

CERAMIC COMPOSITION WITH LOW DIELECTRIC CONSTANT AND METHOD OF MAKING SAME

FIELD OF THE INVENTION

This invention relates to ceramic materials and ceramic compositions in general, and, in particular to a ceramic composition with a low dielectric constant and method of making same.

BACKGROUND OF THE INVENTION

The use of ceramic compositions to form components for the electronics industry is well known. One application for a ceramic composition with a low dielectric constant (K) involves patch antennas. A low dielectric constant material may be required in order to achieve a wider bandwidth for certain antenna applications. Moreover, significant cost savings and processing advantages may be achieved when a ceramic composition is used to form a patch antenna using a low cost forming method such as pressing or tape casting.

Another application for a low dielectric constant ceramic composition involves substrates for multilayer ceramic packages. Multilayer ceramic circuits have been used for many years to increase circuit functionality per unit of area. Low dielectric constant materials are often required for ceramic substrates used in high speed applications, such as IC interconnects, for example.

A ceramic composition with a low dielectric constant must also possess other desirable properties in order to find wide scale usage in electronic applications. For example, if the required sintering or firing temperature of the ceramic composition is too high, then only electrically functional materials with very high melting temperatures, such as tungsten and molybdenum, may be used to form the conductors and transmission lines attached thereto. Thus, cofirability is an important material property. Tungsten and molybdenum tend to have poor electrical properties and, in particular, poor conductivity properties which render them unsatisfactory for many high-speed, complex radio frequency ("RF") circuitry applications. Moreover, such compositions are often fired at a temperature of approximately 1600° C. in a hydrogen atmosphere for extended periods of times In addition to the high processing costs, materials such as tungsten and molybdenum are also very expensive.

On the other hand, if the ceramic composition has a lower firing temperature, it may be cofired with a wide variety of highly electrical functional materials such as silver, palladium/silver, gold, platinum, nickel and copper. Of course, as the sintering temperatures decrease, processing costs during manufacturing decrease accordingly.

There are several other material properties of interest for use in multilayer RF devices and the like. Low loss, i.e., a high Q (small loss tangent) material is a property which helps the overall performance of the device. Electrical Q is defined as the inverse of the loss tangent. The loss tangent is defined as the ratio of the imaginary part of the complex dielectric constant of a material to its real part. An electrical Q value greater than 900 is most desirable. Another important property is the coefficient of resonant frequency ("$T_f$") which is the measure of how much the resonant frequency of a filter made using a material shifts with a change in temperature. A low $T_f$ value, measured in ppm/°C., is also very desirable. From a materials perspective, the ability to tape cast a composition using a doctor blade technique in conjunction with traditional tape casting processes is extremely advantageous in the formation of green tapes for multilayer and other applications. Moreover, if a composition is sufficiently flexible such that it may be adapted to various different forming methods, such as both dry pressing and tape casting, this would also be highly desirable.

The use of cordierite to provide a low dielectric constant (K) is well known in the prior art. U.S. Pat. No. 5,206,190 issued to Jean discloses a dielectric composition containing cordierite and glass. U.S. Pat. No. 5,532,194 issued to Kawashima discloses a cordierite glass-ceramic and method for manufacturing the same. A novel composition may be achieved when a celsian phase is created when a glassy precursor material is combined with a high purity cordierite composition such that the celsian phase is formed at low temperatures and offers desirable electrical properties such as high Q and low K.

Accordingly, there exists a need to provide a multilayer ceramic material and methods of making those materials and/or multilayer substrates that demonstrate the characteristics necessary for economical use in RF device applications while avoiding the limitations inherent in the prior art. Moreover, the ceramic material must be easily and repeatably fabricated, and amenable to manufacturing methods that produce materials with consistent electrical and mechanical properties.

BRIEF DESCRIPTION OF THE DRAWINGS

FIG. 4 is a graph plotting electrical Q values vs. sintering temperature for various particle size ratios in accordance with the present invention.

DETAILED DESCRIPTION OF THE PREFERRED EMBODIMENT

Figure 1:
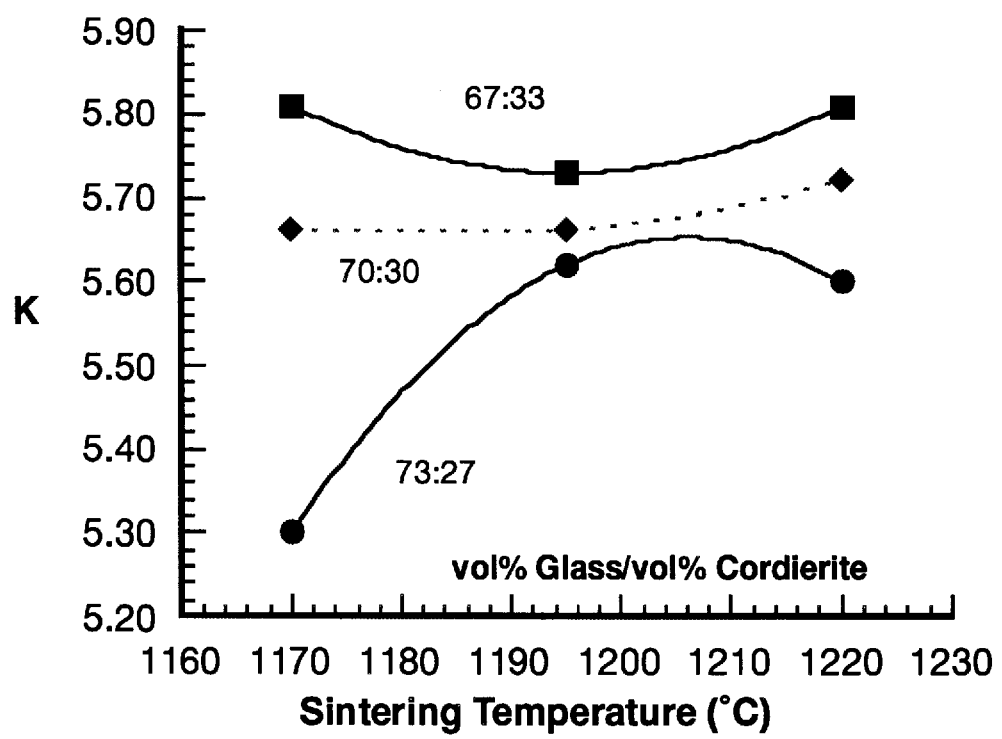
FIG. 1 is a graph plotting dielectric constant (K) vs. sintering temperature for various compositional formulations in accordance with the present invention.

A ceramic composition with a low dielectric constant (K) which also exhibited the properties of high Q, temperature stability, and a firing temperature less than about 1330° C., which is achieved through the formation of a celsian phase which is created when a glassy precursor material reacts with a high purity cordierite material, and which may find many applications in the field of electronics, including but not limited to, patch antennas and multilayer ceramic packages, would be considered an improvement in the art.

While the specification concludes with claims defining the features of the invention that are regarded as novel, it is believed that the invention will be better understood from a consideration of the following description and discussion of the figures and tables.

The novel multiphased ceramic composition disclosed herein are composite ceramic bodies, the green body of which comprises an engineered glassy precursor, also referred to as the glass additive, as well as a high purity cordierite ($2MgO \cdot 2Al_2O_3 \cdot 5SiO_2$) material. The term engineered glassy precursor material refers to the fact that the glass additive is specifically chosen in order to accomplish three things: First, to provide a high solubility for the high purity cordierite material; second, to react with the cordierite material to form a celsian type phase; and third, to lower the overall sintering temperature of the composition.

The cordierite ($2MgO.2Al_2O_3.5SiO_2$) reacts with the barium containing glassy precursor material ($BaO.B_2O_3.SiO_2$) upon firing to form a multiphase ceramic body including at least one celsian phase ($BaO.Al_2O_3.2SiO_2$). The appearance of the celsian phase corresponds to an increase in electrical Q. Indeed, it is by reacting the cordierite, which has a very high Q in the range of about 2500, with a very lossy glass material, with a Q in the range of about 100, that produces a ceramic composition having a Q value greater than 900, which is ideal for many RF applications. In effect, the Q value is optimized by the selective combination of two carefully chosen materials in predetermined ratios.

The ratio of glassy precursor material to cordierite in the green body is another important aspect of the present invention. A significant challenge involved finding ratios that provided the desirable electrical and mechanical properties, such as low K and high Q, and was amenable to large scale manufacturing processes, while simultaneously providing a composition that could be sintered at low temperatures. This balance was achieved when the glassy precursor material comprises between 60–80 volume % of the ceramic body. In a preferred embodiment of the present invention, the glassy precursor material comprises between 65–75 volume % of the ceramic body. If less than 60 volume % of the glassy precursor material is used, the sintering temperature becomes unacceptably high. On the other hand, if more than 80 volume % of the glassy precursor material is used, desirable electrical properties, such as K and Q, cannot be maintained.

Another interesting aspect of the ratio of glassy precursor material to cordierite in the green ceramic involves the fact that the amount of glassy precursor material added to the cordierite is tailored to provide a self limiting chemical reaction. A self limiting chemical reaction can best be explained by understanding that in any chemical reaction, two or more reactants combine to form one or more products at an interface between the reactants. The chemical reaction is said to be self limiting if one of the reactants is used up or completely consumed during the chemical reaction or if the reaction is controlled by the reacting concentrations at the reaction interface. In this instance, the barium in the glassy precursor material ($BaO.B_2O_3.SiO_2$) reacts with the cordierite ($2MgO.2Al_2O_3.5SiO_2$) to create a celsian phase ($BaO.Al_2O_3.2SiO_2$). Therefore, the system may be a self limiting chemical reaction if the barium in the glassy precursor material is consumed completely during the chemical reaction. In this instance, the self-limiting characteristics are controlled by diffusion kinetics. This reaction is substantially self-limiting to the extent that diffusion may be limited by time constraints. A further description of the starting materials in provided below:

The Main Composition

The cordierite is a single phase metal oxide material in the $MgO-Al_2O_3-SiO_2$ ternary system. The term "cordierite" is a term well known in the art which is used herein to describe crystalline magnesium aluminum silicates having the formula $Mg_2Al_4Si_5O_{18}$. In a preferred embodiment, a high purity composition, having a purity level greater than about 99.9% cordierite by weight, was provided by Baikowski International Corporation, Charlotte, N.C.

The powder properties, which are provided below, are to be used as a guideline only. It should be understood that as cordierite powders are used which deviate from these properties, sintering, dielectric, and other properties may be affected. The particle size for the cordierite may be about 1.74 $\mu$m to about 2.27 $\mu$m. The surface area for the cordierite may be 2.5 $m^2$/gm to about 4.6 $m^2$/gm. The Tap Density for the cordierite may be about 2.6 $gm/cm^3$.

The Glassy precursor material may typically be a barium-borosilicate commercial glass composition. This glass additive contains primarily barium oxide and silicon oxide with lesser amounts of boron oxide, zirconium oxide, zinc oxide, aluminum oxide, and calcium oxide also possibly present in the additive.

In a preferred embodiment, a commercial glass, number CF1415 is used which may be provided by Ferro Corporation, Cleveland, Ohio.

The glass powder properties which are provided below are to be used as a guideline only, and it should be understood that as glass powders are used which deviate from these properties, sintering and dielectric properties may be affected. The particle size for the glass additive may be about 0.83 $\mu$m to about 2.04 $\mu$m. The surface area for the glass additive may be 3.6 $m^2$/gm to about 5.9 $m^2$gm. The Tap Density for the glass additive may be about 3.75 $gm/cm^3$.

As was described above, the glassy precursor in the ceramic composite consists of most importantly barium oxide, as well as oxides of silicon, boron, and other oxide modifiers. The silicon and the boron are called glass formers in that they are responsible for the formation of the glass. The barium oxide is called a glass modifier and it modifies the local structure of the glass thereby lowering the softening point of the glass.

Preparation of the Composition

Example One

A typical process for the preparation of the sintered ceramic material in accordance with the instant invention, and adapted for use in multilayered ceramic device fabrication, is presented below. Proper preparation of the powders involves first weighing out the proper concentrations and ratios of powders. Although various compositions may be mixed to achieve a ceramic composition with both a low dielectric constant and the other desirable properties and characteristics, one composition which will achieve the desired results will contain a weight fraction concentration of 37.20% cordierite, 62.80% of the glass additive, 0.50% of Tamol 901, 1.0% of PEG 200, and 13.30% of a 15 wt. % solution of PVA. These concentrations of powders and additives are known to provide a composition which may be used for applications such as patch antennas and multilayer ceramics where low dielectric constants are required.

The powders may be weighed in plastic trays using a three-beam scale and subsequently placed in a Nalgene jar. Next the Tamol 901 is weighed using 7 ml. eyedroppers to insure accurate measurement thereof. The Tamol 901 is added directly to the powders. Tamol 901 is a dispersant and it is added to the composition for the purpose of providing optimum mixing characteristics.

Water is then added to the Nalgene jar; the jar is then closed and shaken until the powders are wet. The volume of the resulting slurry should be approximately 25% of the total Nalgene jar volume. Milling media should be added to the jar until the milling media just breaks the surface of the slurry.

After the jar is closed tightly, it should then be placed on a Sweeco Vibratory Mill and milled for 6–8 hours. The slurry should then be strained into a large drying pan. The media and the jar should be rinsed several times with deionized water, each time straining the diluted slurry into the drying tray. The drying tray should then be covered with perforated aluminum foil and placed in a 100° C. drying oven to evaporate the water. When the powder is dry, the powder should be removed and grinded using a mortar and pestle to break up soft agglomerates.

The next step involves adding the PEG 200 (polyethylene glycol with a median molecular weight of 200) and PVA (polyvinyl alcohol in a 15 wt. % solution) to the powder. PEG 200 is a lubricant and it serves the purpose of reducing the packing density gradient in pressed bodies. PVA is a binder and it is added to the composition for the purpose of holding the powders together during pressing. Of course, all organic binders will be burned off during the firing operation. These organic additives are mixed with a mortar and pestle until the powder has a uniform coarse texture. Next, the powder/binder mixture is granulated through a #60 mesh sieve. Finally, the powder/binder mixture is placed in a drying tray dried in a 60° C. oven for about 30 minutes to evaporate any residual moisture. Once the powder has been dried and cooled to room temperature, it should then be stored in an air-tight container.

Testing the Composition

Once the desired composition was completed, sample pellets were made to test the electrical and mechanical properties of the composition. This was accomplished by weighing about 4 grams of powder and pouring the powder into a 0.75" diameter die. Using a manual hydraulic press, the pressure was slowly increased to 6000 lbs. (13.6 kpsi). At this pressure, a sustained load of 6000 lbs. is applied for approximately 30 seconds. Then the pressure release valve is turned slowly to decrease the load applied to the pellet. The pressed pellet is then placed in a bed of zirconia sand. The zirconia sand should be pre-baked to a temperature of 1300° C. for a period of approximately 1 hour in air to remove any potential contaminants.

The pellets are then placed in a furnace capable of reaching 1200° C. and fired according to a predetermined firing profile. Although research found that there are multiple firing profiles which could be used to achieve the desired properties, the following profile proved to be an effective low-temperature firing cycle. The furnace was ramped to 500° C. at a rate of 100° C./hr. The furnace was then held at 500° C. for 1 hour. Next, the furnace was ramped to a temperature of approximately 1150°–1190° C. at a rate of 150° C./hr. The furnace was then held at 1150°–1190° C. for 1 hour. Finally, the furnace was ramped back down to 500° C. at a rate of 50° C./hr then down to room temperature (25° C.) at a rate of 100° C./hr.

The thermal profiled described above is satisfactory for the compositional materials described above in the concentrations described above. However, as new raw materials are received from various manufacturers, or as reformulations are made in the compositions, then the thermal profile may have to be adjusted in view of the new data. Similarly, adjustments may have to be made based on periodic analysis, particle size, surface area, purity, and a variety of other factors.

Once the sample pellets were thermally cycled, their properties were tested using conventional laboratory equipment and testing techniques. Based on a sample of approximately thirty (30) pellets, the following properties were observed: The dielectric constant (K) of the composition was approximately 5.7±0.2. The electrical Q≧900 and $T_f$=35 ppm/°C. as measured following the ASTM test method #F752-82.

The analysis which lead to the selection of certain compositions can be better understood with reference to the to the two tables provided below. Table 1 below shows the particle size and electrical properties for various sample compositions Table 2 below shows the electrical properties of titanium dioxide used as a dopant. This data is representative of the sample testing which was performed.

TABLE 1

Particle Size and Electrical Properties for Various Compositions

| Glass/ Cordierite | Glass Particle Size (μm) | Cordierite Particle Size (μm) | Particle Size Ratio (Glass: Cordierite) | Sintering Temperature (°C.) | | | | | | | | | |
|---|---|---|---|---|---|---|---|---|---|---|---|---|---|
| | | | | 1075 | | 1100 | | 1125 | | 1150 | | 1175 | |
| | | | | K | Q | K | Q | K | Q | K | Q | K | Q |
| 80/20 | 1.53 | 1.72 | 0.89 | | | | | | | 4.88 | 1044 | 5.28 | 1168 |
| 70/30 | 1.85 | 1.74 | 1.06 | | | 5.76 | 1097 | 5.64 | 1079 | 5.74 | 973 | | |
| 70/30 | 1.1 | 1.74 | 0.63 | 4.8 | 11.43 | 5.63 | 1150 | 5.54 | 1256 | 5.7 | 1115 | 5.72 | 1130 |
| 70/30 | 1.53 | 1.72 | 0.89 | | | 5.41 | 1003 | 5.5 | 1023 | 5.75 | 1034 | 5.84 | 1015 |
| 70/30 | 2.32 | 1.72 | 1.35 | | | 5.7 | 1164 | 5.77 | 1135 | 5.78 | 1047 | | |
| 70/30 | 0.83 | 1.72 | 0.48 | | | 5.59 | 1123 | 5.88 | 1131 | 5.78 | 1033 | | |
| 60/40 | 1.53 | 1.72 | 0.89 | | | 5.96 | 919 | 5.91 | 824 | 5.89 | 718 | 5.81 | 661 |

TABLE 2

Electrical Properties of Titanium Dioxide Used as a Dopant

| TiO2 (wt %) | K | Q | Sintering Temperature (C) | Tf (+ppm/°C.) |
|---|---|---|---|---|
| 0.1 | 4.95 | 1039 | 1050 | |
| | 6.24 | 1090 | 1100 | 39 |
| | 6.03 | 1048 | 1150 | |
| 1 | 5.55 | 1105 | 1050 | |
| | 5.93 | 1072 | 1100 | 35.9 |
| | 6.1 | 1041 | 1150 | |
| 5 | 6.2 | 1074 | 1050 | |
| | 7.03 | 1020 | 1100 | 21.8 |

X-Ray Diffraction analysis of the sample composition revealed that the fired pellets contained four phases: unreacted cordierite, hexacelsian, celsian, and a residual glass material. Evidence of a residual glass was confirmed by SEM observation of the HF-etched polished surfaces. The inventors postulate that it is the presence of the celsian phase, in conjunction with the unreacted cordierite, which gives the composition its low dielectric constant, high Q, low firing temperature, and other desirable electrical properties.

Shrinkage of the sample pellets during firing increased rapidly with increased firing temperatures up to about 1150° C. attaining about 16% shrinkage at this temperature. Moreover, the shrinkage properties were both predictable and controllable, thus the composition may use traditional processing techniques and a shrinkage factor may be incorporated into all final product calculations.

A major concern in the formulation of the composition of the present invention was insuring that the various processing variables did not have an adverse effect on the dielectric properties of K and Q. The effect of numerous processing variables on the dielectric properties of K and Q were measured and it was determined that the dielectric properties are independent of pressing pressure. It was also determined that the K and Q values both increased with increasing firing temperature reaching a maximum between 1150° C. and 1180° C. Thus, in a preferred embodiment, the firing temperature will be approximately 1150° C. to 1180° C.

The effect of particle size on K and Q values was also evaluated. The particle size of the cordierite was held constant at approximately 1.7 $\mu$m. and various samples were fired at 1150° C. for one hour. By increasing the glass to cordierite particle size ratio, both the K and Q values were found to increase. This is most likely due to an increased degree of densification. Whereas the Q values fluctuated at lower temperatures, a clearer trend was observed at higher soak temperatures. This indicates that a glass to cordierite particle size ratio of at least approximately 1.0 should be used to ensure stable dielectric properties and lower soak temperatures. At higher glass to cordierite particle size ratios, the larger glass particles provide a greater glass flow, promoting densification at lower temperatures. Analysis of other properties showed that a maximum electrical Q value was achieved at a heating rate of 150° C./hr. Moreover, to achieve stable dielectric values for K and Q, a hold time (soak time) of approximately at least one hour should be used.

The effect of compositional variation (i.e., changes in the glass to cordierite volume ratio) on dielectric properties K and Q was also measured. By making a small change in the compositional makeup of the starting materials, in the range of about ±3%, changes in the dielectric properties were observed. This may be best understood with reference to FIGS. 1 through described in detail below:

FIG. 1 is a graph plotting dielectric constant (K) vs. sintering temperature for various compositional formulations in accordance with the present invention. One such standard formulation contained 70 volume % glassy precursor material to 30 volume percent high purity cordierite material. Other formulations were then made which varied the compositions slightly to include more and less cordierite material. More specifically, compositions were made which contained 27 volume % cordierite and 33 volume % cordierite. Referring to FIG. 1, it should be noted that the dielectric constant (K) values remained in the range of 5.2 to 5.9 and were thus acceptable for their intended purpose in RF electronic applications.

Figure 2:
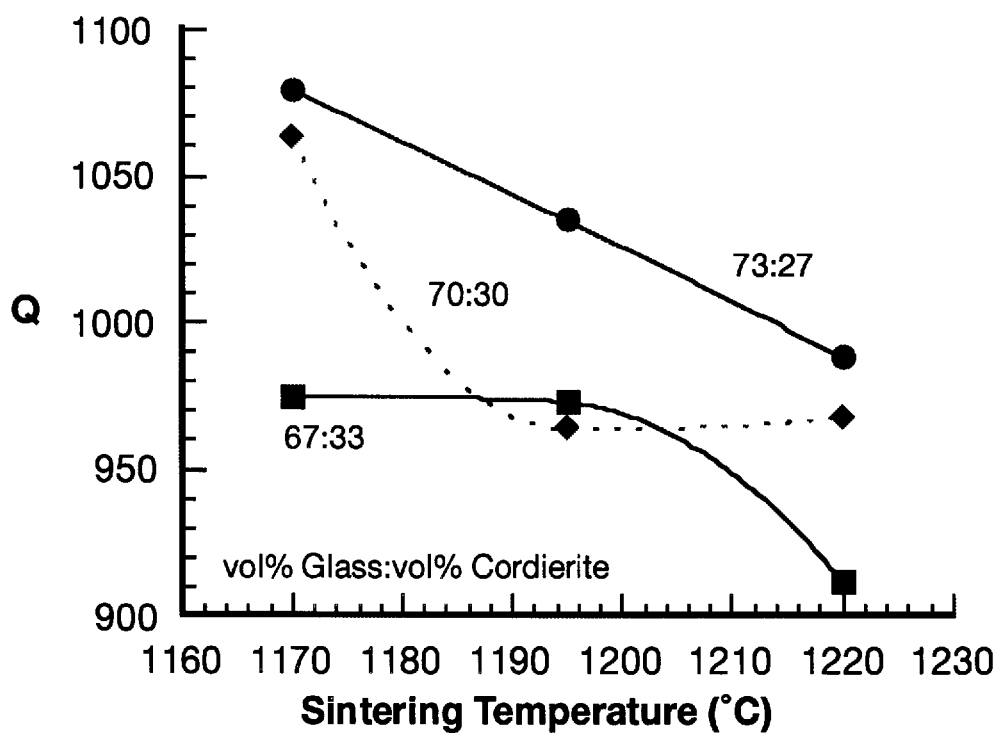
FIG. 2 is a graph plotting electrical Q values vs. sintering temperature for various compositional formulations in accordance with the present invention.

FIG. 2 is a graph plotting electrical Q values vs. sintering temperature for various compositional formulations in accordance with the present invention. The compositional ratios are the same as those measured in FIG. 1. Referring to FIG. 2, it should be noted that the electrical Q values remained in the range of 900 to 1100 and were thus acceptable for their intended purpose in RF electronic applications. Overall, this data suggests that a slight change in composition does not severely effect dielectric properties.

Figure 3:
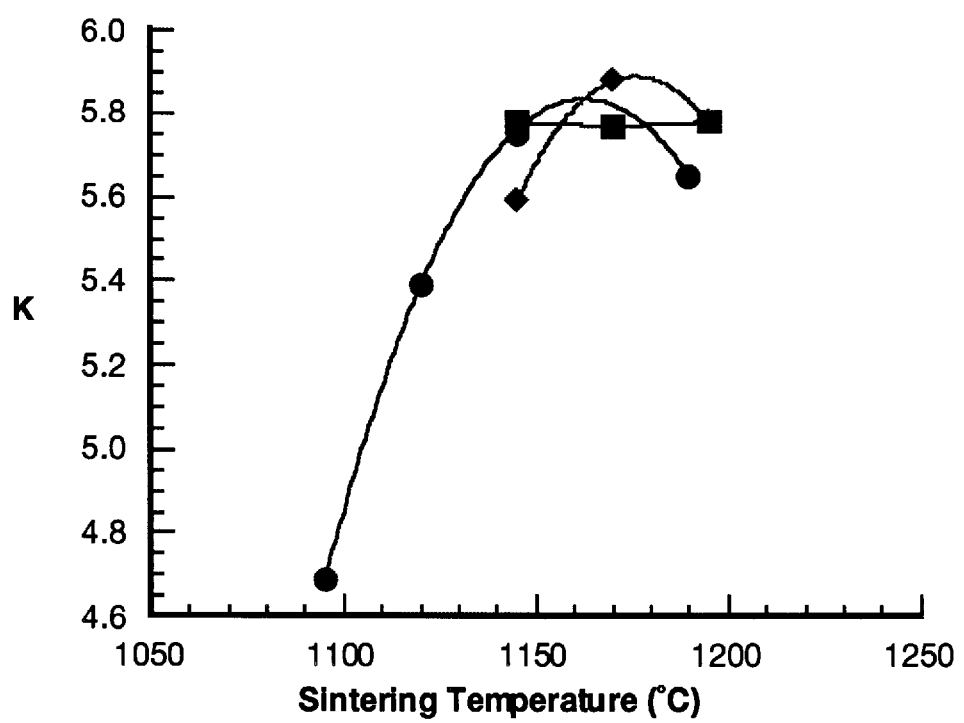
FIG. 3 is a graph plotting dielectric constant (K) vs. sintering temperature for various particle size ratios in accordance with the present invention.

FIG. 3 is a graph plotting dielectric constant (K) vs. sintering temperature for various particle size ratios in accordance with the present invention. This graph measured dielectric constant (K) as a function of peak firing temperature. The thermal profile used in the processing of these samples is the same as that discussed previously when describing the preparation of the composition. Using three different particle size ratios (PS=particle size of glass:particle size of cordierite), the dielectric values (K) were measured for increasing sintering temperatures in the range of 1050°–1250° C. The three particle size ratios were 1.7 $\mu$m glass to 1.7 $\mu$m cordierite; 2.4 $\mu$m glass to 1.7 $\mu$m cordierite; and 0.9 $\mu$m glass to 1.7 $\mu$m cordierite respectively. The sintering temperature of maximum K tended to decrease with increasing particle size ratio, but stayed within the 1150°–1180° C. range. All samples included a soak time of one hour. Referring to FIG. 3, the K values varied between 5.6 and 5.9 for most samples, again making them acceptable for the electronic applications of interest.

FIG. 4 is a graph plotting electrical Q values vs. sintering temperature for various particle size ratios in accordance with the present invention. The samples in FIG. 4 were the same as those used in FIG. 3 and they both incorporated particle size ratios of 1.7 $\mu$m glass to 1.7 $\mu$m cordierite; 2.4 $\mu$m glass to 1.7 $\mu$m cordierite; and 0.9 $\mu$m glass to 1.7 $\mu$m cordierite respectively. Referring to FIG. 4, it should be noted that the electrical Q values ranged between 600 and 1200 and clustered in the range of 950–1150. These values are acceptable for the intended application and provide a high Q value necessary for RF applications. FIGS. 3 and 4 helped determine the optimum firing temperature for the ceramic composition to maintain desirable electrical properties.

Whereas the prior samples reflect laboratory work, it will be recognized that the compositions described above may be formed using commercial, large scale glass making equipment. The glassy precursor material may be prepared by conventional glassmaking techniques by mixing the desired components in the desired proportions and heating the mixture to form a homogenous melt. The glass may then be dry quenched through cooled rollers, and the resultant flakes dry milled into finely divided particles or frit, as is well known in the art.

In a further aspect, this invention is directed to a multi-layer ceramic substrate comprising layers of the composition described above and interconnected conductor layers of silver paste therebetween. The assemblage is then fired to form a dense hermetic structure.

After sintering, various phases are present in the ceramic composition. Namely, a residual glass phase, as well as celsian and cordierite phases are all present in the fired composition. The benefit of the glassy precursor material/cordierite reaction is that it reduces the volume fraction of the low Q glassy precursor material, and increases the volume fraction of the high-Q crystalline phases. This suggests that the final ceramic body has a higher Q than would be present in a glassy precursor material/cordierite composite in which the glassy precursor material and the cordierite did not react. Thus, it is believed that the creation of the celsian phase, and the elimination of a certain amount of the glassy precursor material, which gives the resulting composition desirable electrical properties and characteristics. Additionally, the celsian phase, which provides desirable electrical properties, is formed at relatively low temperatures.

Still another processing option involves the introduction of dopants into the green composition. Such dopants, for example tin oxide ($SnO_2$), manganese oxide ($Mn_3O_4$), and vanadium pentoxide ($V_2O_5$), may be added to the composition before sintering. These dopants may serve the purpose of decreasing the sintering temperature or serving as a crystallization promoter for the celsian phase It has been observed that the use of dopants has an effect on the temperature stability of the composition. Table 2 above shows the effect on electrical properties when titanium dioxide ($TiO_2$) is used as a dopant.

A scanning electron microscope (SEM) was used to analyze the material after the glass had been removed by an HF etch. This revealed that the composition revealed a characteristic microstructure whereby the celsian and cordierite grains exhibited a compatible contour along the boundary between the two phases. In other words, the celsian and cordierite grains were interlocked like pieces of a jigsaw puzzle thus providing a distinctive feature in the microstructure of the composition. Consequently, these compositions, in which the celsian particles follow the contour of the cordierite grain, provide a traceable feature that may be used to identify these novel compositions.

While the preferred embodiments of the invention have been illustrated and described, it will be clear that the invention is not so limited Numerous modifications, changes, variations, substitutions and equivalents will occur to those skilled in the art without departing from the spirit and scope of the present invention as defined by the appended claims.

What is claimed is:

1. A method of fabricating a multiphase ceramic body, wherein at least one phase is a celsian type phase, said ceramic body characterized by a dielectric constant less than about 6.0 and a Q in excess of about 900, said method comprising the steps of:

providing a glassy precursor material comprising about 40–60 wt. % $BaO_2$, about 25–45 wt. % $SiO_2$, about 5–25 wt. % $BO_2$ and about 0–10 wt. % of at least one of $ZrO_2$, $ZnO_2$, $Al_2O_3$, and $Ca_2O_3$;

mixing said glassy precursor material with operative amounts of a high purity cordierite material; and heating said glassy precursor material and said high purity cordierite material at temperatures in excess of about 1100° C.

2. A method as in claim 1, wherein said glassy precursor material makes up between about 60 to about 80 volume % of the ceramic body.

3. A method as in claim 1, wherein said glassy precursor material preferably comprises between about 65 and about 75 volume % of the ceramic body.

4. A method as in claim 1, wherein said high purity cordierite material has a purity of at least about 99%.

5. A method as in claim 1, wherein said high purity cordierite material has a particle size of about 1.5–2.0 μm.

6. A method as in claim 1, further comprising the additional step of adding a dopant selected from the group of $TiO_2$, $SnO_2$, $Mn_3O_4$ and $V_2O_5$ prior to heating.

7. A method as in claim 1, wherein said multiphase ceramic body is cofired with a metal system at a temperature below about 1330° C.

8. A method as in claim 1, wherein the heating includes a soak time of at least one hour at temperatures in excess of about 1100° C.

9. A substantially self-limiting method for forming a multiphase ceramic body having at least one celsian type phase, comprising the steps of reacting operative amounts of a glassy precursor material containing a barium silicate material with a cordierite material containing an aluminosilicate material so that the barium silicate material reacts with the aluminosilicate material to form the at least one celsian type phase.

10. A method as in claim 9, wherein said multiphase ceramic body is further characterized by a dielectric constant between about 4.0 and about 6.0.

11. A method as in claim 9, wherein said multiphase ceramic body is further characterized by an electrical Q of at least about 900.

12. A method as in claim 9, wherein said multiphase ceramic body is further characterized by a $T_f$ of about −30–40 ppm/°C.

13. A method as in claim 9, wherein said glassy precursor material makes up between about 60 and about 80 volume % of the ceramic body.

14. A method as in claim 9, wherein said glassy precursor material comprises between about 65 and about 75 volume % of the ceramic body.

15. A multiphase ceramic composition comprising:

about 65–75 volume % of a glassy precursor material comprising about 40–60 wt. % $BaO_2$, about 25–45 wt. % $SiO_2$, about 5–25 wt. % $BO_2$ and about 0–10 wt. % of at least one of $ZrO_2$, $ZnO_2$, $Al_2O_3$, and $Ca_2O_3$; and about 25–35 volume % of a high purity cordierite material.

16. A ceramic composition as in claim 15, wherein at least one phase of said multiphase ceramic composition is a celsian type phase.

17. A ceramic composition as in claim 16, wherein the celsian type phase contains both celsian and hexacelsian.

18. A ceramic composition as in claim 15, wherein said material is characterized by a dielectric constant between about 4.0 and about 6.0.

19. A ceramic composition as in claim 15, wherein said material is characterized by an electrical Q of at least about 900.

20. A ceramic composition as in claim 15, wherein said material is characterized by a $T_f$ of about −30–40 ppm/°C.

21. A tape casting composition comprising the composition of claim 15 dispersed in a polymeric binder/plasticizer matrix in a volatile organic solvent.

22. A method of forming a multiphase ceramic composition, comprising the steps of:

weighing out the proper concentrations and ratios of a glassy precursor material containing a barium silicate material and a high purity cordierite material and subsequently placing both of the materials in a jar;

adding operative amounts of a dispersant;

forming a slurry by adding water and milling media to the jar and closing and shaking until the slurry is approximately 25% of the total jar volume;

placing the jar on a vibratory mill and milling for approximately 6–8 hours;

rinsing the jar thoroughly with deionized water;

straining the slurry into a drying tray;

covering the drying tray with perforated foil and placing the drying tray in a 100° C. drying oven to evaporate the water;

grinding the dry powder using a mortar and pestle to break up agglomerates;

adding organic binders and lubricants to the powder to form a powder/binder mixture;

granulating the powder/binder mixture through a mesh sieve;

placing the powder/binder mixture in a drying tray and drying in a 60° C. oven for approximately 30 minutes to evaporate any residual moisture; and storing the powder in an air-tight container after the powder has been cooled to room temperature.

* * * * *